United States Patent
Will et al.

(10) Patent No.: US 10,021,973 B1
(45) Date of Patent: Jul. 17, 2018

(54) CLOSET PARTITION SYSTEM AND METHOD OF ASSEMBLY

(71) Applicant: The Stow Company-Holland, Inc., Holland, MI (US)

(72) Inventors: Bryon J. Will, Holland, MI (US); Peter J. Beebe, Holland, MI (US); Jonathan T. Fancher, Grand Rapids, MI (US)

(73) Assignee: THE STOW COMPANY-HOLLAND, INC., Holland, MI (US)

( * ) Notice: Subject to any disclaimer, the term of this patent is extended or adjusted under 35 U.S.C. 154(b) by 0 days.

(21) Appl. No.: 15/409,941

(22) Filed: Jan. 19, 2017

(51) Int. Cl.
| | |
|---|---|
| *A47F 7/00* | (2006.01) |
| *A47F 5/08* | (2006.01) |
| *A47B 61/00* | (2006.01) |
| *A47B 96/02* | (2006.01) |
| *A47B 47/00* | (2006.01) |
| *F21V 23/00* | (2015.01) |
| *A47B 95/00* | (2006.01) |
| *A47B 21/06* | (2006.01) |

(52) U.S. Cl.
CPC .............. *A47B 61/00* (2013.01); *A47B 21/06* (2013.01); *A47B 47/0075* (2013.01); *A47B 95/008* (2013.01); *A47B 96/02* (2013.01); *F21V 23/002* (2013.01); *A47B 2220/0077* (2013.01); *A47B 2220/02* (2013.01)

(58) Field of Classification Search
CPC ... F21V 23/002; A47B 61/00; A47B 47/0075; A47B 96/02; A47B 95/008; A47B 96/04; A47B 21/06; A47B 96/06; A47B 96/063; A47B 96/068; A47B 96/1416; A47B 96/1433; A47B 96/1466; A47B 97/001; A47B 2220/0036; A47B 2220/0041; A47B 2220/0052; A47B 2220/0075; A47B 2220/0077; A47B 2220/02; A47B 2230/06; A47B 47/02; A47B 47/0025; A47B 47/04; A47B 47/042; A47B 57/00; A47B 57/58; A47F 5/08; A47F 3/001; A47F 11/10
USPC ............. 211/186, 87.01, 26; 108/23, 42, 48, 108/50.01, 180, 193; 312/223.5, 223.6, 312/242; 248/20, 226.11, 227.2, 231.71, 248/245, 250
See application file for complete search history.

(56) References Cited

U.S. PATENT DOCUMENTS

| | | | | |
|---|---|---|---|---|
| 3,765,344 | A * | 10/1973 | Ferdinand | A47B 45/00 108/102 |
| 4,720,016 | A * | 1/1988 | Kay | A47B 61/003 211/103 |

(Continued)

*Primary Examiner* — Jennifer E. Novosad
(74) *Attorney, Agent, or Firm* — Warner Norcross and Judd LLP (57) ABSTRACT

A closet partition system for mounting on a wall includes first and second vertical partitions with a back panel extending therebetween to define a storage area A bracket is mounted to the first vertical partition to support the back panel relative to the first vertical partition. The bracket includes a seat adapted to receive the rear edge of the first vertical partition and a support leg extending orthogonal to the seat to support the back panel relative to the rear edge of the first vertical partition. When the rear edge of the first vertical partition is disposed within the seat, the support leg offsets the first back panel from the rear edge of the first vertical partition to define a raceway between the first back panel and the rear edge of the first vertical partition.

11 Claims, 10 Drawing Sheets

(56) References Cited

U.S. PATENT DOCUMENTS

| | | | |
|---|---|---|---|
| 4,928,833 A | | 5/1990 | Huizenga |
| 5,135,194 A | * | 8/1992 | Laughon ............... A47B 95/008 248/243 |
| 5,277,393 A | * | 1/1994 | Nicholson ............ A47B 95/008 108/108 |
| 5,593,049 A | * | 1/1997 | Farham ................. H02G 3/288 174/499 |
| 5,624,168 A | * | 4/1997 | Licciardello, Sr. .. A47B 95/008 211/94.01 |
| 5,626,084 A | * | 5/1997 | Kelly ..................... A47B 96/02 108/23 |
| 5,718,493 A | * | 2/1998 | Nikolai ................ A47B 95/008 312/245 |
| 5,758,585 A | * | 6/1998 | Latchinian ........... A47B 96/067 108/108 |
| 5,762,213 A | | 6/1998 | Heneveld, Sr. |
| 5,819,958 A | * | 10/1998 | Dement ............... A47B 95/008 108/152 |
| 6,079,803 A | * | 6/2000 | West ...................... A47B 45/00 211/186 |
| 6,179,434 B1 | * | 1/2001 | Saraiji .................... A47F 3/001 108/23 |
| 6,527,565 B1 | * | 3/2003 | Johns ..................... H01R 25/14 362/418 |
| 7,499,838 B2 | | 3/2009 | Madawala |
| 7,562,951 B2 | | 7/2009 | Tallman |
| 7,784,626 B2 | * | 8/2010 | Jacques ............. A47B 96/1416 211/103 |
| 8,014,979 B2 | | 9/2011 | Madawala |
| 2004/0099771 A1 | * | 5/2004 | Schloss ................ H05K 7/1491 248/49 |
| 2006/0071132 A1 | * | 4/2006 | Harari .................... A47B 67/04 248/200 |
| 2006/0145442 A1 | * | 7/2006 | Van Loon .............. A47B 51/00 280/79.7 |
| 2006/0266901 A1 | | 11/2006 | Tallman |
| 2008/0278932 A1 | * | 11/2008 | Tress ..................... A47B 97/00 362/133 |
| 2009/0014401 A1 | | 1/2009 | Tallman |
| 2009/0294612 A1 | * | 12/2009 | Cline ................... A47B 96/067 248/221.11 |
| 2010/0116762 A1 | * | 5/2010 | Piersant ............... A47B 95/008 211/90.01 |
| 2011/0025180 A1 | | 2/2011 | Ilich |
| 2011/0219706 A1 | * | 9/2011 | Bates .................... A47B 95/008 52/36.1 |
| 2013/0056434 A1 | * | 3/2013 | Artigues ................ A47F 5/0018 211/153 |
| 2013/0062300 A1 | * | 3/2013 | Drake .................... A47B 57/34 211/183 |
| 2013/0105426 A1 | * | 5/2013 | Dyck .................... A47B 57/485 211/134 |
| 2013/0134849 A1 | * | 5/2013 | Menzel ................ A47B 95/008 312/265.5 |
| 2015/0182038 A1 | * | 7/2015 | Wiemer .................. A47F 5/103 108/23 |
| 2017/0143120 A1 | * | 5/2017 | Cattaneo ............. A47B 95/008 |
| 2017/0198871 A1 | * | 7/2017 | Keenan ................... F21S 8/036 |

\* cited by examiner

CLOSET PARTITION SYSTEM AND METHOD OF ASSEMBLY

BACKGROUND

The present invention relates to a closet partition system and more particularly to a closet partition system which provides a space, when assembled, through which items such as wiring for lighting can travel between a light source associated with the closet partition system and a power source.

Closet partition systems, also referred to as closet storage systems, are typically designed to be installed within a closet space in order to facilitate efficient use of the available storage space within the closet. Closet partition systems are designed to enable a user to customize the type of storage options available within the closet, such as shelving designed for specific items (sweaters, shoes, etc.), sliding drawers or baskets, and rods for supporting items by a hanger. The closet partition systems are often designed to include options that enable a user to customize the aesthetics of the space, such as the materials and finishes used for the components of the system.

It is often desirable to provide lighting with the closet partition system. Lighting can illuminate the storage space to make it easier for a user to locate items stored within the space. Lighting can also enhance the aesthetics of the storage system. For example, lighting can be used to highlight specific items stored within the space, such as a watch or shoe collection.

It can be challenging to design a closet partition system that is customizable for different types of spaces and that can also include options such as materials, finishes, lighting, and cables, examples of which include speaker wires, coaxial cables, Ethernet cables, and low voltage wiring. In addition, it is generally desirable for the closet partition system to be designed for installation by both professionals and non-professionals. For example, lighting options require a light source as well as a power source. It is desirable that the lighting option be configured to utilize mains power or existing outlets that are available within the space. However, this leads to the additional challenge of accommodating wiring to connect the light source with the source of power. Thus, there is a challenge in the field of closet partition systems of designing functional, aesthetically pleasing storage options which include lighting. An additional challenge arises from designing such systems to be installed by both professionals and optionally non-professionals.

SUMMARY

The aforementioned issues are addressed by the present invention in which a closet partition system includes a bracket for supporting a back panel between opposing vertical partitions, the bracket adapted to support the back panel spaced from a rear edge of the opposing vertical partitions to provide a raceway behind the back panel.

According to an embodiment of the invention, a closet partition system adapted to be assembled adjacent a wall includes a first vertical partition having a rear edge configured to be disposed adjacent to the wall, a front edge opposite the rear edge, and a first vertical partition body extending between the front and rear edge. A first back panel having an exterior face configured to be disposed adjacent the wall and an opposing interior face is mounted adjacent the rear edge of the first vertical partition and extends orthogonal to the first vertical partition body. The first back panel and the first vertical partition at least partially define a first storage area. A first bracket is mounted to the first vertical partition for supporting the first back panel relative to the first vertical partition. The first bracket includes a seat adapted to receive the rear edge of the first vertical partition and a first support leg adapted to support the first back panel. The bracket seat is defined by a first leg extending parallel to the rear edge of the first vertical partition and a second leg extending orthogonally from a distal end of the first leg. The first support leg extends orthogonally from a distal end of the second leg, away from the bracket seat. When the rear edge of the first vertical partition is disposed within the bracket seat, the first support leg offsets the first back panel from the rear edge of the first vertical partition to define a raceway between the first back panel and the rear edge of the first vertical partition.

According to another embodiment, the closet partition system includes multiple first brackets mounted to the rear edge of the first vertical partition. At least one of the first or second legs includes at least one aperture configured to receive a fastener for mounting the first bracket to the first vertical partition. At least one of a thickness of the first leg and a length of the second leg are selected to provide the desired offset of the first back panel from the rear edge of the first vertical partition.

In another embodiment, the closet partition system further includes a light source having an electrical cable for connecting with a power source. The first back panel can include an aperture through which the electrical cable passes from the first storage area to the raceway. A horizontal shelf can be supported by the first vertical partition and include a first surface for supporting an item and an opposing second surface. A cavity in one of the first or second surfaces is adapted to receive the light source therein. The horizontal shelf may further include a cavity that is adapted to receive the electrical cable therein, wherein the electrical cable is routed through the cavity and the aperture in the first back panel to the raceway. The cavity may be open on at least one side or enclosed.

In another embodiment, the first bracket comprises a metal, a metal alloy, steel, or aluminum. The first bracket optionally includes a corner relief at an intersection between the first leg and the second leg.

In another embodiment, the closet partition system further includes a second back panel mounted adjacent the rear edge of the first vertical partition. The second back panel may define a second storage area on a side of the first vertical partition opposite the first storage area. The first bracket can further include a third leg extending orthogonally from a distal end of the first leg. The first, second, and third legs may define the bracket seat and a second support leg can extend orthogonally from a distal end of the third leg. When the rear edge of the first vertical partition is disposed within the seat, the second support leg offsets the second back panel from the rear edge of the first vertical partition to define a raceway between the second back panel and the rear edge of the first vertical partition.

In yet another embodiment, the closet partition system further includes a second vertical partition. The second partition includes a rear edge configured to be disposed adjacent to the wall, a front edge opposite the rear edge, and a first vertical partition body extending between the front and rear edge. The first vertical partition, second vertical partition, and first back panel can define the first storage area. The first bracket can be mounted to the second vertical partition for supporting the first back panel relative to the second vertical partition. When the rear edge of the second vertical partition is disposed within the seat, the first support leg offsets the first back panel from the rear edge of the second vertical partition to define a raceway between the first back panel and the rear edge of the second vertical partition. The first bracket can further include a third leg extending orthogonally from a distal end of the first leg. The first, second, and third legs can define the bracket seat and a second support leg can extend orthogonally from a distal end of the third leg. When the rear edge of the first or second vertical partition is disposed within the seat, the second support leg offsets a second back panel from the rear edge to define a raceway between the second back panel and the rear edge of the first or second vertical partition.

According to another embodiment of the invention, a method of assembling a closet partition system includes providing a first and second vertical partition, each of the first and second vertical partitions including a rear edge, a front edge opposite the rear edge, and a partition body extending between the front and rear edges. A plurality of brackets is mounted to the rear edges of the first and second vertical partitions. Each of the plurality brackets includes (a) a seat adapted to receive the rear edge of the first and second vertical partitions, the seat defined by a first leg extending parallel to the rear edge and a second leg extending orthogonally from a distal end of the first leg, and (b) a first support leg extending orthogonally from a distal end of the second leg, away from the seat. The plurality of brackets is mounted to the first and second vertical partitions with the rear edge positioned within the seat. The first and second vertical partitions are assembled opposite one another and a back panel is assembled between the first and second vertical partitions to define a storage area. The method further includes offsetting the back panel relative to the rear edges of the first and second vertical partitions. The plurality of brackets can be mounted to the first and second vertical partitions such that the first support leg extends toward the first storage area and abuts the first back panel. The first support leg can offset the first back panel from the rear edges of the first and second vertical partitions to define a raceway between the first back panel and the rear edges of the first and second vertical partitions.

The embodiments of the invention provide a number of advantages. Firstly, the brackets described herein offset the back panels from the rear edges of the vertical partitions to provide a raceway behind each back panel that can be used to hide unsightly cabling. Secondly, accommodating the cabling in the raceway behind the back panel, rather than within the storage area in front of the back panel protects the cabling from damage or tangling that may occur during use of the storage area for storing other items. Third, the raceway can also accommodate features that may project from the wall which the system is positioned against, such as electrical or cable outlets. Fourth, the brackets facilitate installation of the closet partition system in environments in which the adjacent wall construction is irregular or damaged. The closet partition system can optionally be used with an anchoring system to anchor the closet partition system to an adjacent wall.

These and other advantages and features of the invention will be more fully understood and appreciated by reference to the description of the current embodiment and the drawings.

DESCRIPTION

I. Structure

Figure 1:
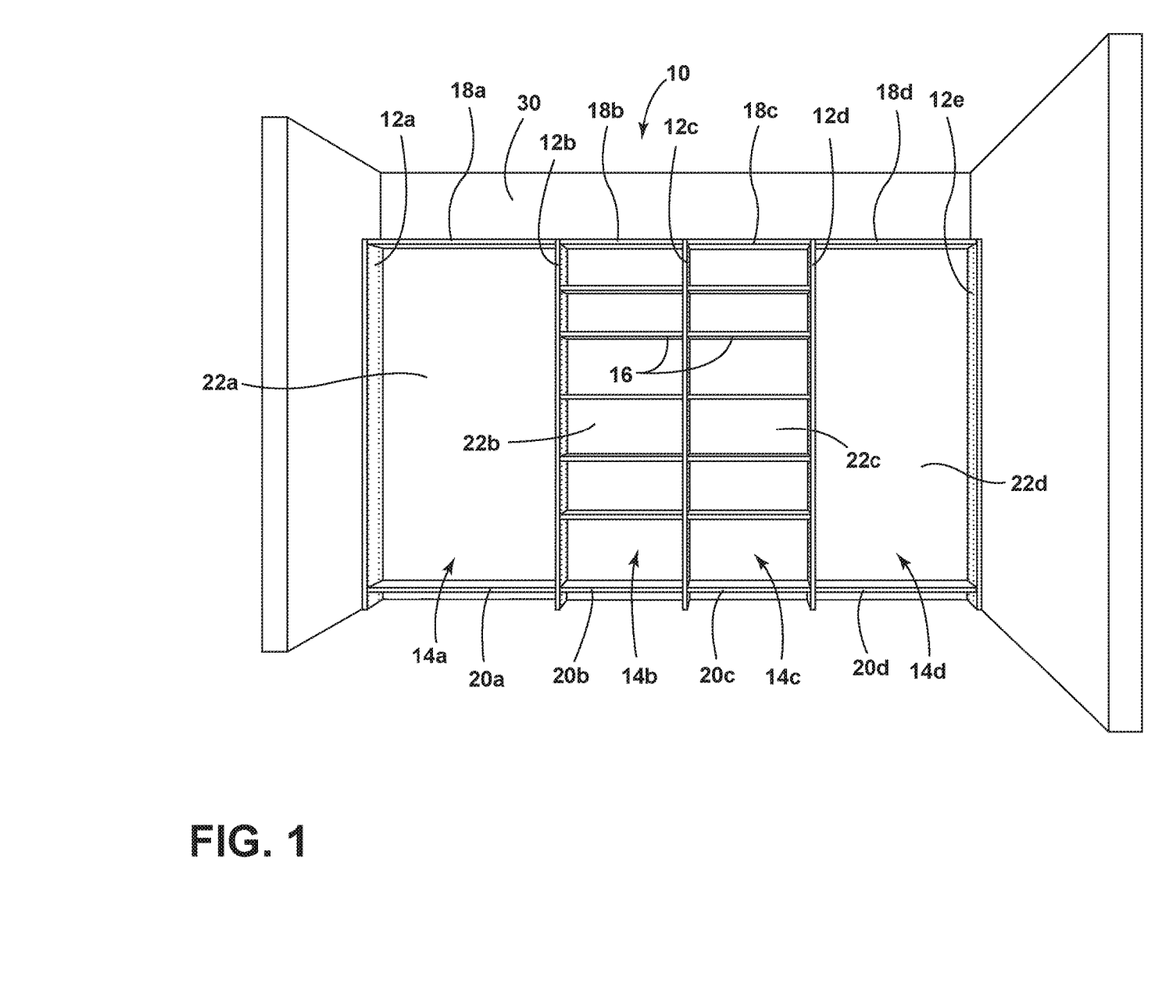
FIG. 1 is a perspective view of a closet partition system according to one embodiment.

A closet partition system in accordance with an embodiment of the invention is illustrated in the drawings and designated 10. While the closet partition system 10 is illustrated and described in the context of use with in a closet, it will be understood that the closet partition system 10 may be used in any room or enclosure in a residential or business setting. With reference to FIG. 1, the closet partition system 10 includes a plurality of vertical partitions 12a, 12b, 12c, 12d, and 12e (also referred to as side panels) for partitioning the system into a plurality of separate storage areas 14a, 14b, 14c, and 14d. The closet partition system 10 may include any combination of storage elements, non-limiting examples of which include shelving, sliding drawers or baskets, movable doors, rods for supporting items by a hanger, and hooks. By way of example, storage areas 14b and 14c include a plurality of shelves 16.

Still referring to FIG. 1, the closet partition system 10 optionally includes a plurality of top panels 18a, 18b, 18c, and 18d and bottom panels 20a, 20b, 20c, 20d connected to adjacent vertical partitions 12a-e. The top and bottom panels 18a-d and 20a-d can connect the vertical partitions 12a-e at or adjacent to a top and a bottom of the vertical partitions 12a-e, respectively, as shown. Alternatively, one or more of the top and/or bottom panels 18a-d and 20a-d can connect the vertical partitions 12a-e anywhere along a body or edge of the vertical partitions 12a-e. In another example, one or more storage areas 14a-d includes only a corresponding top panel 18a-d and does not include a corresponding bottom panel 20a-d.

Each storage area 14a-d, can also be defined by a back panel 22a, 22b, 22c, and 22d disposed between opposing vertical partitions 12a-12b, 12b-12c, 12c-12d, and 12d-12e, respectively. Each back panel 22a-d can have a height generally corresponding to a height of the vertical partitions 12a-e, although the back panels 22a-d can be provided having any desired height. For example, the back panels 22a-d may have a height less than the height of the vertical partitions 12a-e if the back panels 22a-d are adapted to rest upon the bottom panels 20a-d rather than the floor surface supporting the vertical partitions 12a-e. The back panels 22a-d can optionally be provided in multiple widths to accommodate different spacing between opposing vertical partitions 12a-e, as illustrated in FIG. 1.

The closet partition system 10 is illustrated as being assembled adjacent a wall 30. The wall 30 may be an interior or exterior wall. While the embodiments of the invention are described in the context of the closet partition system 10 being positioned adjacent a wall, it will be understood that the closet partition system 10 may be used in any desired location and that the closet partition system 10 may be used adjacent other structures, non-limiting examples of which include windows, room dividers, and shelving units, in a manner similar to that described herein. The vertical partitions 12a-e may be supported on the floor surface, as illustrated, and optionally anchored to the wall 30. Alternatively, the vertical partitions 12a-e are not supported on the floor surface and are mounted to the wall 30 for support above the floor surface.

Figure 2:
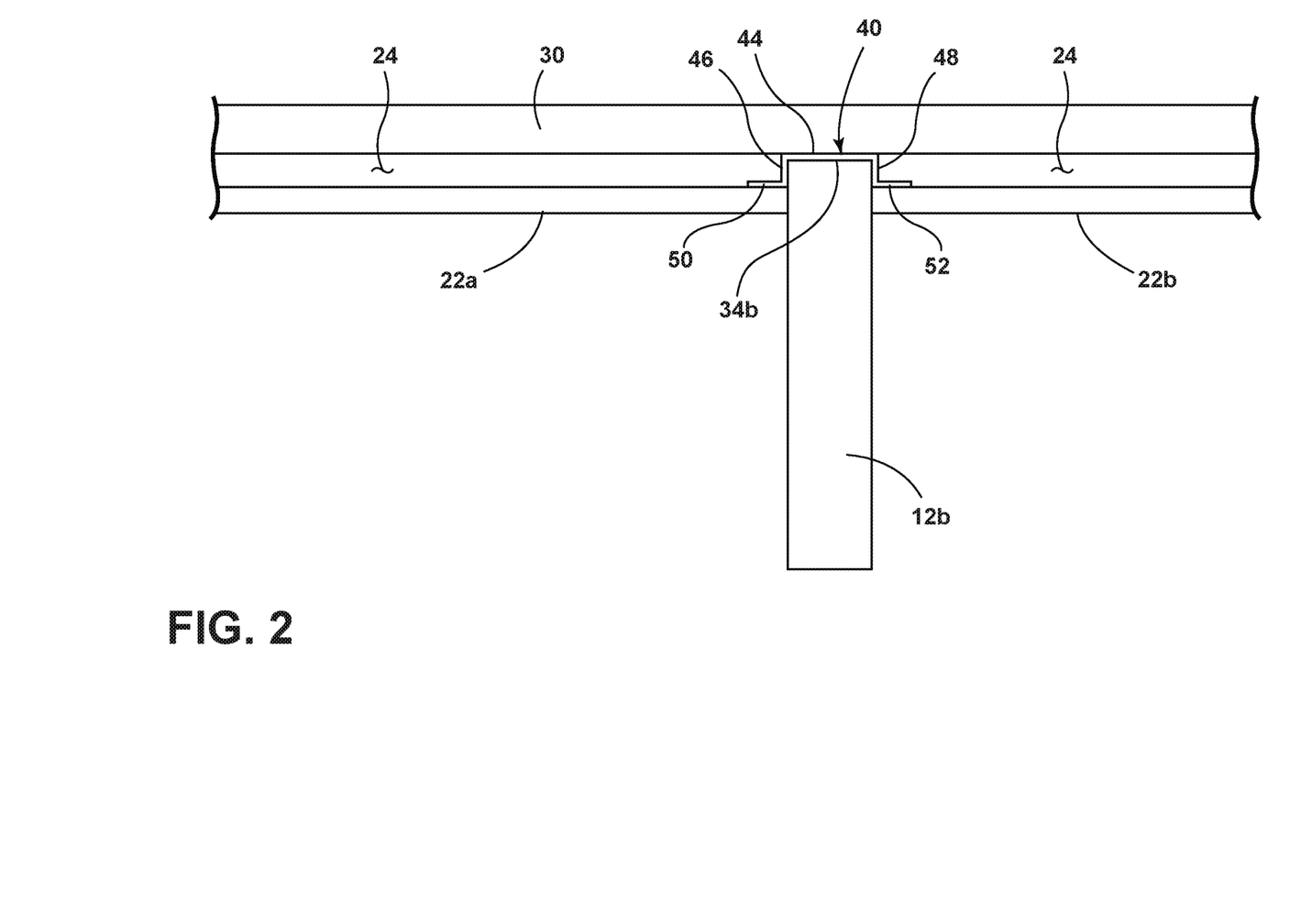
FIG. 2 is a top-down view of a portion of the closet partition system of FIG. 1.
Figure 3:
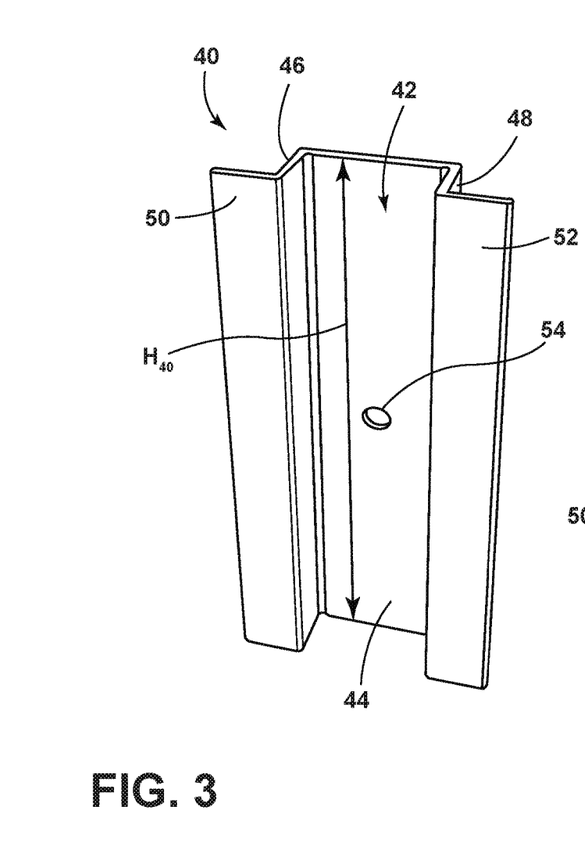
FIG. 3 is a front perspective view of a back panel bracket according to another embodiment.
Figure 4:
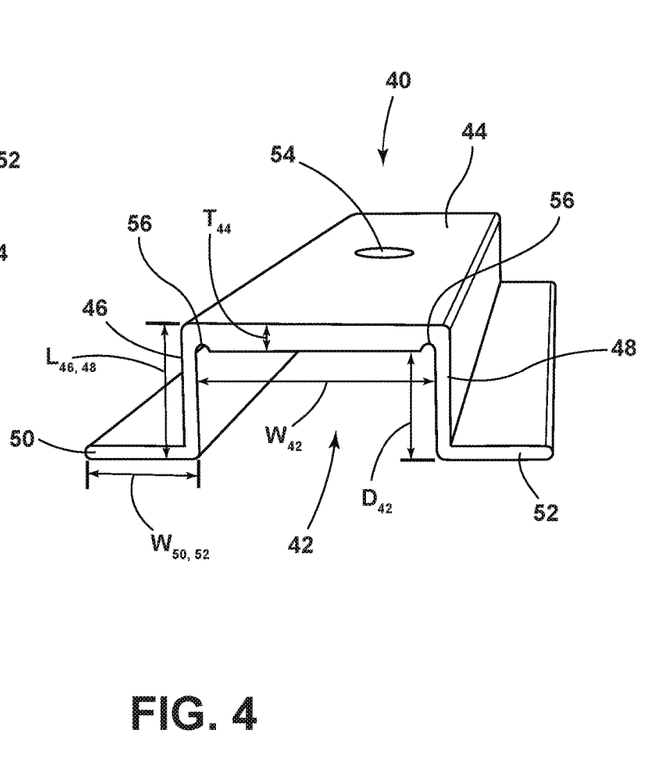
FIG. 4 is a side perspective view of the back panel bracket of FIG. 3.

Referring now to FIGS. 2-4, vertical partition 12b includes a rear edge 34b to which is mounted at least one bracket 40. The bracket 40 is configured as mounting hardware for mounting the back panels 22a-d relative to the vertical partitions 12a-e. For the sake of brevity, bracket 40 is described in the context of a single vertical partition 12b, although it will be understood that each vertical partition 12a-e of the closet partition system 10 can include one or more brackets 40.

Referring now to FIGS. 3-4, each bracket 40 includes a vertical partition seat 42 defined by a first leg 44, a second leg 46 and a third leg 48. The seat 42 can be configured to receive the rear edge 34b of the vertical partition 12b. The seat 42 has a width $W_{42}$ corresponding to an interior width of the first leg 44 and based on a width of the vertical partition rear edge to which the bracket 40 is to be mounted. A depth $D_{42}$ of the seat 42 is based on a length $L_{46, 48}$ of the second and third legs 46, 48 and a thickness $T_{44}$ of the first leg 44. Each bracket 40 also includes first and second back panel support legs 50 and 52 extending from a distal end of the second and third legs 46 and 48, respectively. The first and second back panel support legs 50 and 52 each have a width $W_{50, 52}$ configured to support a back panel 22a-d. While the first and second back panel support legs 50 and 52 are illustrated as having the same width $W_{50, 52}$, the first and second back panel support legs 50 and 52 can have different widths as desired. The width $W_{50, 52}$ of the first and second back panel support legs 50 and 52 may be selected based on the dimensions and weight of the back panels 22a-d to be supported thereon.

The bracket 40 may have an overall height $H_{40}$ corresponding to a height of the first leg 44. The bracket height $H_{40}$ may be selected as desired based on the dimensions of the vertical partition 12a-e to which the bracket 40 is to be mounted, the intended spacing of the brackets 40, and/or the number of brackets 40 intended for use with each vertical partition 12a-e. The bracket 40 may include one or more mounting apertures 54 configured to receive a fastener therein for attaching the bracket 40 to a vertical partition 12a-e. The mounting aperture 54 is preferably located in the first leg 44, as illustrated. Optionally, the mounting aperture 54 may be formed in the second or third legs 46, 48. The bracket 40 may also include a corner relief 56 at the interior junction between the second leg 46 and the first leg 44 and between the third leg 48 and the first leg 44.

Figure 5:
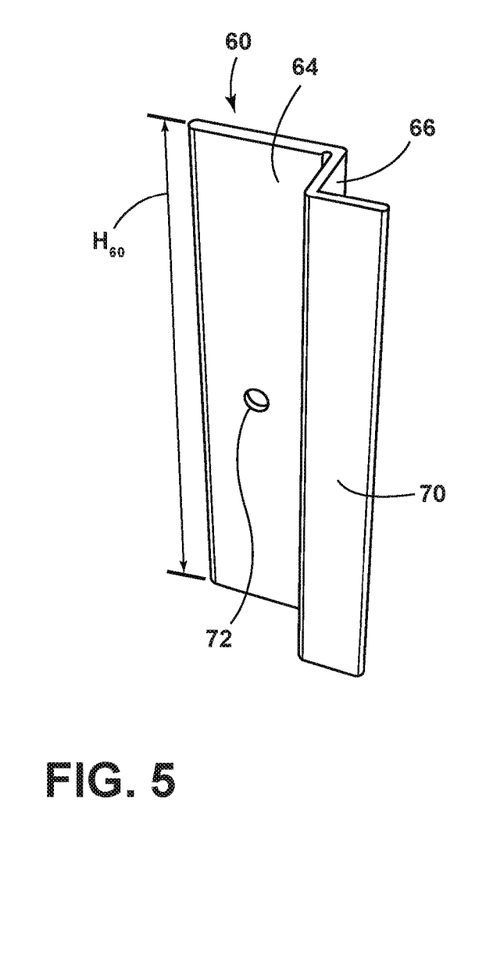
FIG. 5 is a front perspective view of a back panel bracket according to another embodiment.
Figure 6:
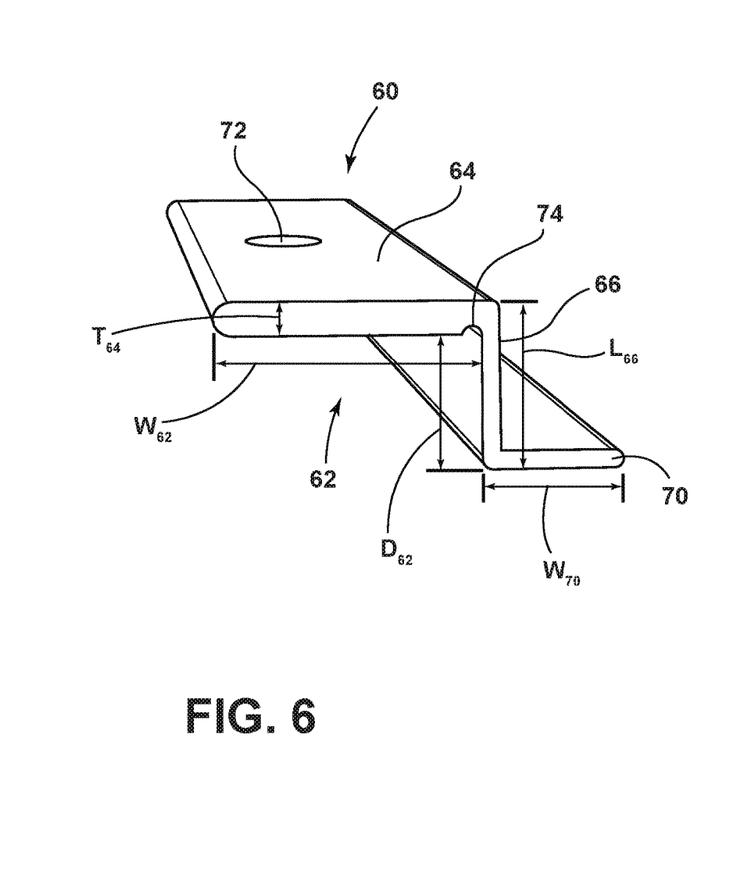
FIG. 6 is a side perspective view of the back panel bracket of FIG. 5.

Referring now to FIGS. 5 and 6, in addition to the bracket 40, or as an alternative to the bracket 40, one or more of the vertical partitions 12a-e may include a bracket 60. The bracket 60 is similar to the bracket 40 except that the bracket 60 includes only a single back panel support leg extending to one side of the bracket and the vertical partition seat is defined by only two legs. In general, the bracket 40 may be referred to as a double-sided bracket which supports a back panel on both sides of the vertical partition while the bracket 60 may be referred to as a single-sided bracket which supports a back panel on only a single side of the vertical partition.

The bracket 60 includes a vertical partition seat 62 defined by a first leg 64 and a second leg 66. The seat 62 can be configured to receive the rear edge 34b of the vertical partition 12b. The seat 62 has a width $W_{62}$ corresponding to a width of the first leg 64. A depth $D_{62}$ of the seat 62 is based on a length $L_{66}$ of the second leg 66 and a thickness $T_{64}$ of the first leg 64. Each bracket 60 also includes a first back panel support leg 70 extending from a distal end of the second leg 66. The first back panel support leg 70 has a width $W_{70}$ configured to support a back panel 22a-d.

Referring to FIG. 5, the bracket 60 may have an overall height $H_{60}$ corresponding to a height of the first leg 64. The bracket height $H_{60}$ may be selected as desired based on the dimensions of the vertical partition 12a-e to which the bracket 60 is to be mounted, the intended spacing of the brackets 60, and/or the number of brackets 60 intended for use with each vertical partition 12a-e. The bracket 60 may include one or more apertures 72 configured to receive a fastener therein for attaching the bracket 60 to a vertical partition 12a-e. The mounting aperture 72 is preferably located in the first leg 64, as illustrated. Optionally, the mounting aperture 72 may be formed in the second leg 66. The bracket 60 may also include a corner relief 74 at the interior junction between the first and second legs 64 and 66.

II. Assembly

An exemplary method of assembling the closet partition system 10 using the brackets 40 is now described. It will be understood that the brackets 60 can be used to assemble the closet partition system 10 in a manner similar to the bracket 40, as will be discussed in more detail below.

Figure 7:
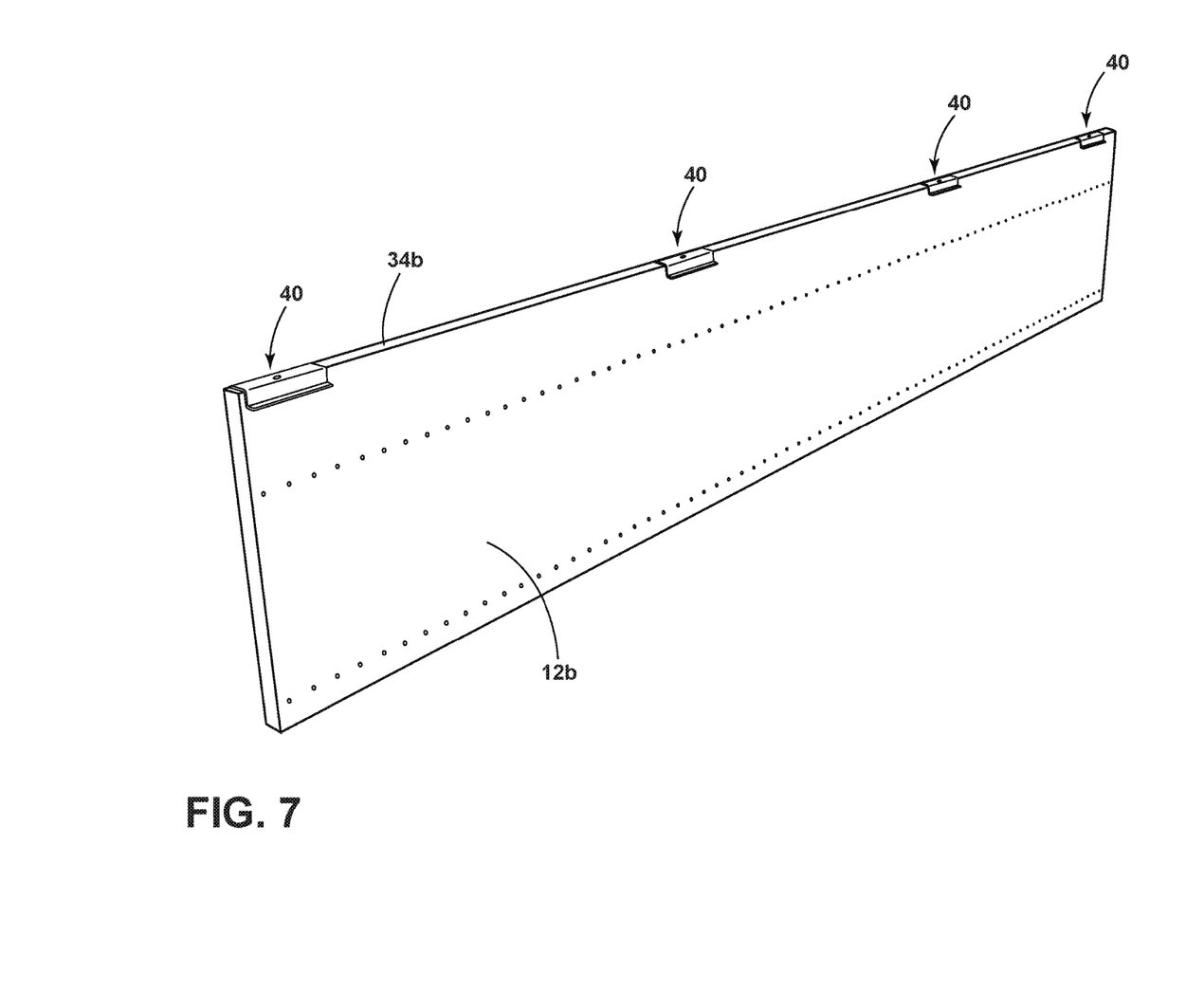
FIG. 7 is a side perspective view of a vertical partition assembled with multiple back panel brackets.

Referring now to FIG. 7, a plurality of brackets 40 can be mounted to the rear edge 34b of the vertical partition 12b. The number and spacing of the brackets 40 may be based on the dimensions of the vertical partition 12b and/or the dimensions of the bracket 40. Brackets 40 may be mounted to each vertical partition 12a-e in a similar manner, depending on the configuration of the closet partition system 10 to be assembled. Depending on the desired configuration, the closet partition system 10 may be assembled with fewer or additional vertical partitions 12a-e than those illustrated in FIG. 1.

Figure 8:
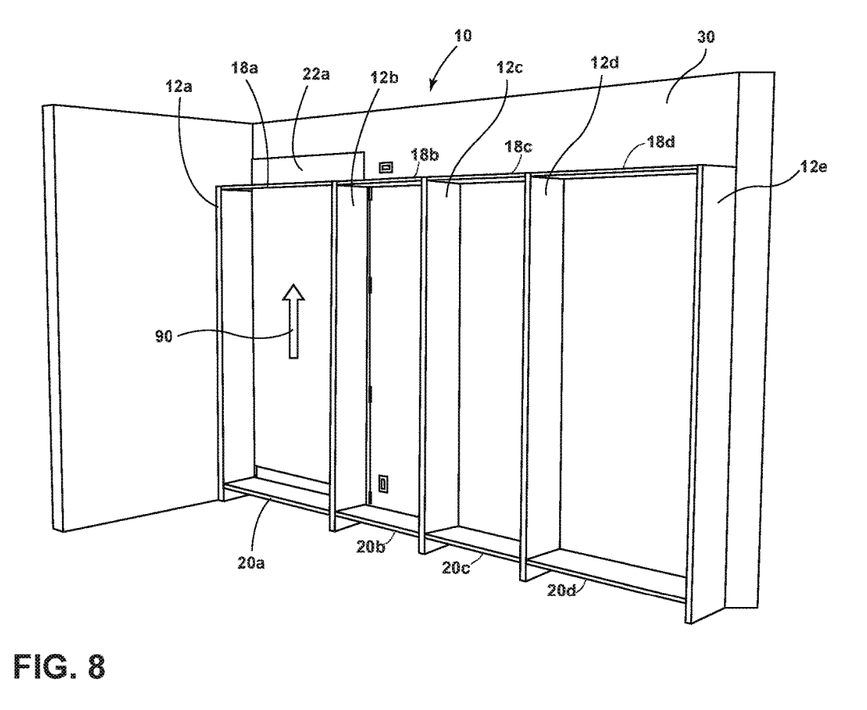
FIG. 8 is a perspective view of a partially assembled closet partition system illustrating the installation of a back panel.
Figure 9:
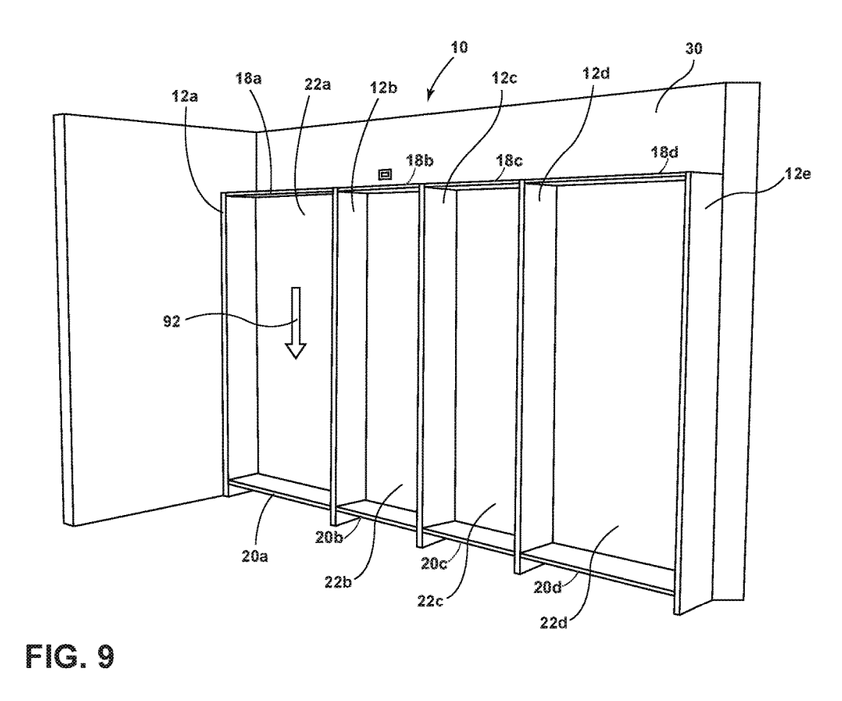
FIG. 9 is a perspective view of the closet partition system of FIG. 8 illustrating the back panel in an assembled position.

With reference now to FIGS. 8 and 9, once the desired number of vertical partitions 12a-e are assembled, the back panels 22a-d are assembled in the spaces between the vertical partitions 12a-e. While FIGS. 8-9 illustrate all of the vertical partitions 12a-e being assembled prior to assembling the back panels 22a-d, it will be understood that the assembly of the vertical partitions 12a-e and back panels 22a-d can occur in any desired sequential or non-sequential order. For example, a user may be decide to assemble first and second vertical partitions 12a and 12b with the first back panel 22a before assembling the next vertical partition 12c. In addition, while it is generally more efficient to assemble the closet partition system 10 in its end location adjacent the wall 30, it will be understood that all or a portion of the closet partition system 10 may be assembled elsewhere and then moved into its end location adjacent the wall 30.

As illustrated by arrows 90 and 92 in FIGS. 8 and 9, respectively, the back panel 22a is slid upward (FIG. 8) into the space between the first and second vertical partitions 12a and 12b and then downward into its final position (FIG. 9). The process can be repeated for each back panel 22b-d. During assembly, the back panel 22a is inserted between the first and second vertical partitions 12a, 12b such that a rear surface of the back panel 22a abuts the back panel support leg 50 of each bracket 40, as illustrated in FIG. 2.

The back panels 22a-d may be installed before or after assembling the top panels 18a-d and/or bottom panels 20a-d, based on the design of the closet partition system 10. For example, if the back panels 22a-d are intended to be supported at a bottom thereof by the bottom panels 20a-d, respectively, the bottom panels 20a-d may optionally be installed prior to installing the back panels 22a-d. Alternatively, the back panels 22a-d may be assembled by passing behind the bottom panels 20a-d and resting on the floor surface.

Mounting hardware, such as one or more additional fasteners (not shown) may be used to attach and/or secure one or more of the components of the closet partition system 10, as is traditional in the field of closet partitions. For example, cam locks, screws, pins, clamps, or brackets may be used to attach the top panels 18a-d and/or the bottom panels 20a-d to the adjacent vertical partitions 12a-e. Optionally, additional fasteners may be used to secure the closet partition system 10 to the wall 30, such as one or more anti-tip brackets.

With reference again to FIG. 2, once assembled the back panel 22a abuts the back panel support leg 50, which offsets the back panel 22a from the rear edge 34b of the vertical partition 12b and thus the wall 30. Back panel support leg 52 offsets the back panel 22b on the side of the vertical partition 12b opposite the back panel 22a. Each bracket 40 offsets the back panel 22a-d from the vertical partition 12a-e to which it is mounted. In this manner, the assembled closet partition system 10 includes a raceway 24 behind each of the back panels 22a-d. Thus, while the rear edges of the vertical partitions 12a-e may be positioned flush with the wall 30, the raceway 24 provides a space between the rear of the back panels 22a-d and the wall 30. These raceways 24 may be used to accommodate features that project away from the wall 30, such as electrical or cable outlets, or to provide a pathway through which electrical wiring or other cables can traverse.

Referring again to FIGS. 3 and 4, the thickness $T_{44}$ of the first leg 44 and/or the length $L_{46, 48}$ of the second and third legs 46, 48 may be selected to provide the desired degree of offset to the back panel 22a from the rear edge 34b of the vertical partition 12b. In addition, the thickness $T_{44}$ of the first leg 44 may be selected to provide the bracket 40 with the desired strength for mounting to the vertical partition 12b. The thickness $T_{44}$ of the first leg 44 and/or the length $L_{46, 48}$ of the second and third legs 46, 48 may also be selected to provide the desired depth $D_{42}$ for the bracket seat 42 which receives the rear edge 34b of the vertical partition 12b. The width $W_{50, 52}$ of each of the back panel support legs 50, 52 may be selected to support the back panels 22a-d based on the dimensions and weight of the back panels 22a-d.

The following are a list of exemplary dimensions that may be used for an aluminum bracket made according to the description of the brackets 40 and 60 described herein for use in a residential closet partition system. These dimensions are by way of example only and not intended to be limiting in any manner, as it will be understood that one or more dimensions or the material used to form the bracket may vary based on the intended use of the closet partition system, the materials used to form the components of the closet partition system, the dimensions of the components of the closet partition system, and/or the weight of the components of the closet partition system. For example, a double-sided bracket may have an overall height, width, and depth of about 101.6 mm, about 51.4 mm, and about 14.2 mm, respectively; a seat depth of about 12 mm; a first leg thickness of about 3 mm; a second and third leg length of about 15 mm; and a back panel support leg length of about 11.9 to about 12.7 mm. An exemplary single-sided bracket can have similar dimensions as the exemplary double-sided bracket except for the overall width is decreased to about 37.2 mm, due to the lack of the third leg and second back panel support leg.

The bracket 60 can be used in a manner similar to that described above for the bracket 40 to offset the back panels 22a-d from the rear edges of the vertical partitions 12a-e. The brackets 40 include first and second back panel support legs 50, 52 which offset a back panel on both sides of the vertical partition. The bracket 60 includes only one back panel support leg 70 and thus offsets a back panel on only one side of the vertical partition.

In one example, the bracket 60 can be mounted to vertical partitions 12a and 12e, as these partitions are adjacent a back panel 22a and 22d, respectively, on a single side. The brackets 40 can be mounted to vertical partitions 12b-d in which a back panel 22a-d is to be offset on both sides of the partition. The lack of a second back panel support leg on the bracket 60 may be convenient for use with vertical partitions that are on the ends of the closet partition system 10. For example, the vertical partitions 12a and 12e may be intended to be flush with an adjacent wall or include an additional end cap trim piece. In these configurations, a second back panel support leg is not useful and/or may be obtrusive and thus the bracket 60 may be preferable to the bracket 40. However, it is within the scope of the invention for the bracket 40 to be used on any vertical partition.

It is also within the scope of the invention for the bracket 60 to be used with vertical partitions which include a back panel on both sides. For example, a first set of brackets 60 may be mounted to the vertical partition 12b in a first direction with the support leg 70 extending toward the vertical partition 12a to offset the back panel 22a. A second set of brackets 60 may be mounted to the vertical partition 12b in the reverse direction with the support leg 70 extending toward the vertical partition 12c to offset the back panel 22b.

Figure 10:
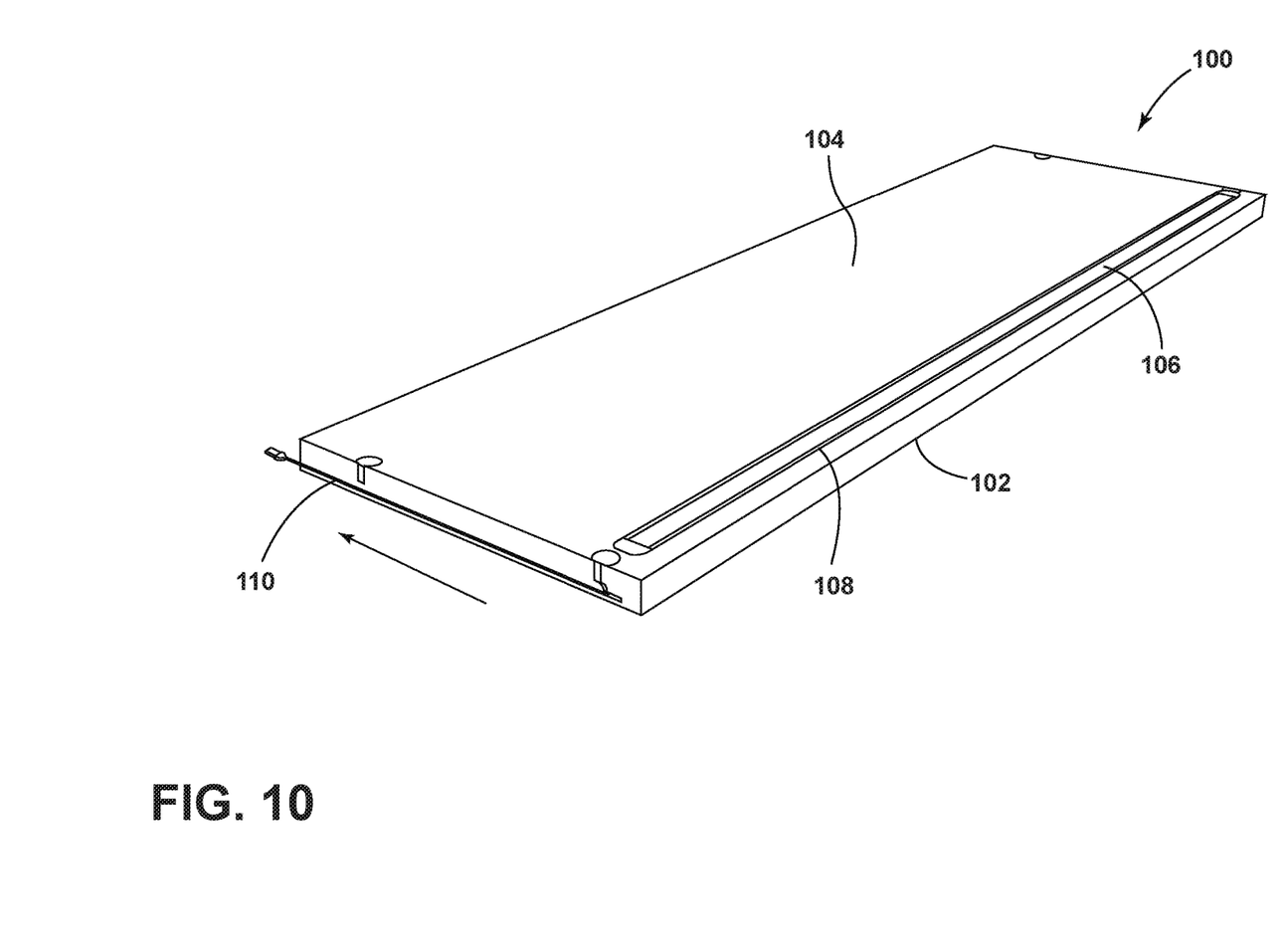
FIG. 10 is bottom-up view of a shelf for use with the closet partition system of FIG. 1.

One exemplary use for the raceway 24 provided by the offset back panels 22a-d is as a path for electrical cables to traverse from the closet partition system 10 to a mains electrical outlet or other source of electrical power. Referring now to FIG. 10, a shelf 100 configured for use with the closet partition system 10 is shown. The shelf 100 may be configured to be supported by the vertical partitions using mounting pegs (not shown), as is known in the field. The shelf 100 may include a support surface 102 and an underside 104. A light source 106 can be mounted to the underside 104 of the shelf 100, optionally within a cavity 108 provided within the shelf 100. The light source 106 can include an electrical cable 110 for supplying electricity to the light source 106 which can also be recessed within the shelf 100. The cavity 108 may be open on at least one side, as illustrated, or enclosed. If the cavity 108 is enclosed, the cavity 108 can include one or more light outlets through which light is emitted from the light source 106.

Alternatively, the light source 106 may be recessed within a front edge or the support surface 102 of the shelf 100. In another example, the light source 106 may be independent of the shelf 100 and simply rest upon the support surface 102. While the shelf 100 is illustrated as having a cavity through which the electrical cable 110 can travel, in an alternative embodiment, the shelf 100 does not include such a cavity.

Figure 11:
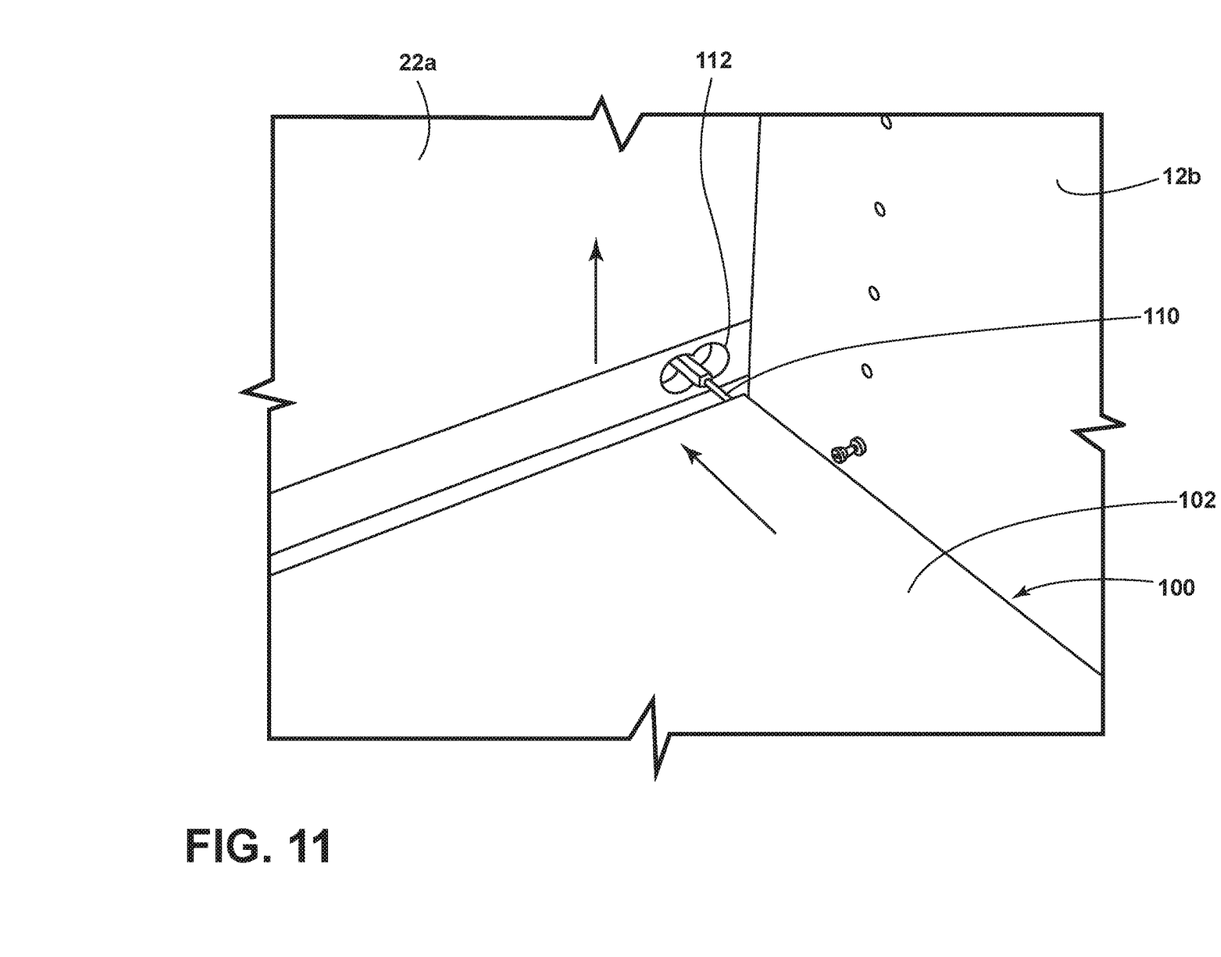
FIG. 11 is a perspective view of a portion of the shelf of FIG. 10 in a partially assembled position.

Referring now to FIG. 11, the shelf 100 can be installed adjacent the back panel 22a (shown) or any other back panel 22b-d. An aperture 112 may be provided within the back panel 22a to allow the electrical cable 110 to pass through the back panel 22a to the raceway 24 behind the back panel 22a. The aperture 112 may be formed by the installer so as to be aligned with the installed shelf 102 such that the electrical cable 110 can pass through the back panel 22a without being visible to a user of the closet partition system 10. For example, an installer may use a drill to form one or more holes in the back panel 22a for passing the electrical cable 110 through the back panel 22a to the raceway 24. Alternatively, the aperture 112 may be pre-formed in the back panel 22a in one or more predetermined locations within the back panel 22a. The installer may choose to install the shelf 102 such that the shelf 102 is aligned with the aperture 112. Alternatively, the shelf 102 may be vertically offset from the aperture 112 and the electrical cable 110 may traverse the shelf 102 to the aperture 112.

Figure 12:
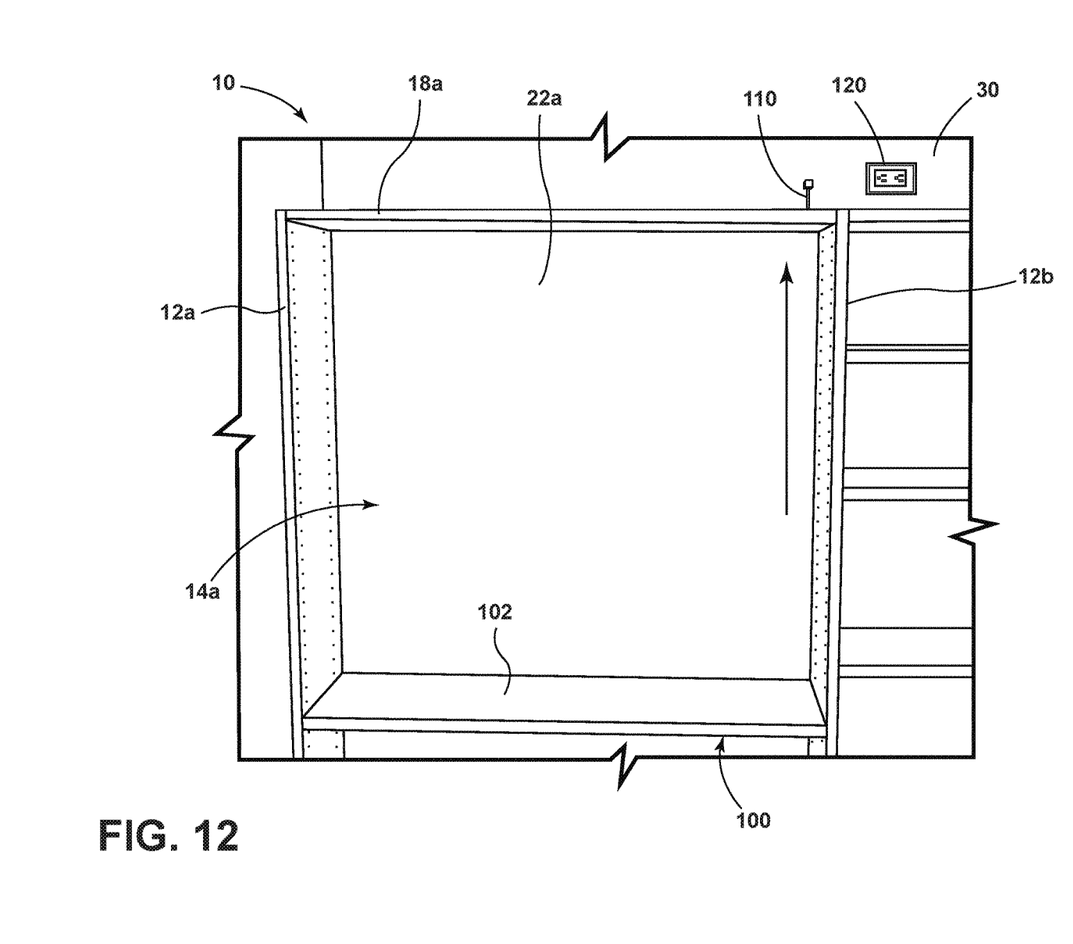
FIG. 12 is a perspective view of the shelf of FIG. 10 in a fully assembled position.

Referring now to FIG. 12, once the electrical cable 110 has passed through the back panel 22a, the electrical cable 110 can be routed to a mains power outlet 120 for providing electrical power to the light source 106. In this manner, the electrical cable 110 can be partially or completely hidden from view, depending on the location of the outlet 120. In addition, routing the electrical cable 110 through the raceway 24 behind the back panel 22a reduces the amount of space that the electrical cable 110 uses within the storage area 14a. Not only is routing the electrical cable 110 behind the back panel 22a and out of sight aesthetically pleasing, but it also reduces the likelihood that the electrical cable 110 may become tangled or damaged during use of the storage area 14a.

It will be understood that the aperture 112 may be used to pass one or more electrical or other types cables through the back panel 22a to the raceway 24 in a manner similar to that described above for the electrical cable 110. The cables may be associated with a recessed light source, such as the light source 106 of FIG. 10, or a separate item that is stored on or mounted to the closet partition system 10. For example, the aperture 112 may be used in a similar manner to pass electrical and/or communication cables associated with various other devices through the back panels 22a-d to the raceways 24 behind each of the back panels 22a-d. Non-limiting examples of additional devices that require cabling include televisions, smart devices, motorized accessory units (e.g. motorized tie rack), clothing irons, coffee maker, beauty accessories, etc.

III. Conclusion

The embodiments described herein provide for a system and method that is easy to use to offset or space the back panel of a closet partition system from a rear edge of the system, and thus any wall the system is positioned against. Offsetting the back panel provides a raceway behind the back panels that can accommodate electrical and/or communication cables in addition to accommodating features that may project slightly from the wall. The presence of the raceway allows the vertical partitions to be positioned or mounted flush against the wall while still providing a space to accommodate elements behind each back panel. Routing cabling behind the back panels instead of within the storage area decreases the visual footprint of the cabling within the storage area, which is more aesthetically pleasing to consumers. In addition, the cabling is protected from damage and/or tangling that may occur during use of the storage area to store items.

The double-sided bracket and single sided bracket include a seat that facilitates consistent and secure mounting of the bracket to the rear edge of a vertical partition. The corner reliefs provided in the brackets facilitate mounting the brackets flush with the rear edge of the vertical partition. Providing the option of either a double-sided or single-sided bracket provides the installer with options for customizing the assembly based on the configuration of the system and the installation location. Placing the bracket mounting apertures in the first leg of the bracket allows the mounting fastener to be inserted lengthwise through the rear edge of the vertical partition and into the body of the vertical partition rather than orthogonal to the rear edge of the vertical partition. Mounting the fastener in this manner may strengthen the connection of the bracket to the vertical partition and decreases the likelihood that the fastener will break through or split near the rear edge of the vertical partition. The use of the double-sided bracket also allows the installer to install a single bracket for offsetting a back panel on both sides of a vertical partition, increasing the ease and consistency with which the back panels can be offset.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components.

Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. A closet partition system adapted to be mounted on a building wall, the system comprising:
    a first vertical partition having a rear edge configured to be disposed adjacent to the wall, a front edge opposite the rear edge, and a partition body extending between the front and rear edge;
    a first bracket secured to the first vertical partition, the first bracket comprising:
        a seat receiving the rear edge of the first vertical partition, the seat defined by a first leg parallel to the rear edge and second and third legs extending orthogonally from the first leg, the first leg adapted to be secured to the wall; and
        first and second back panel support legs extending orthogonally in opposite directions from the second and third legs respectively; and
    first and second back panels each having a rear surface facing the wall and an opposing front surface, the first and second back panels secured to the first and second back panel support legs respectively, the first and second back panels adjacent to the first vertical partition and orthogonal to the vertical partition body, the first and second support legs spacing the first and second back panels respectively from the wall to define first and second raceways between the first and second back panels respectively and the wall.

2. The closet partition system of claim 1 further comprising multiple first brackets mounted to the rear edge of the first vertical partition.

3. The closet partition system of claim 1 further comprising:
    a second vertical partition, having a rear edge configured to be disposed adjacent to the wall, a front edge opposite the rear edge, and a vertical partition body extending between the front and rear edge; and
    a second bracket mounted to the second vertical partition for supporting the first back panel relative to the second vertical partition, the rear edge of the second vertical partition is disposed within the seat of the second bracket, the first support leg of the second bracket offsetting the first back panel from the wall to define a raceway between the first back panel and the wall.

4. The closet partition system of claim 1 wherein at least one of the first leg or the second leg includes at least one aperture configured to receive a fastener for mounting the first bracket to the first vertical partition.

5. The closet partition system of claim 1, further comprising a light source having an electrical cable for connecting with a power source, the first back panel defining an aperture through which the electrical cable passes to the raceway.

6. The closet partition system of claim 5, further comprising a horizontal shelf supported by the first vertical partition, the horizontal shelf defining a first cavity adapted to receive the light source, the horizontal shelf further defining a second cavity adapted to receive the electrical cable.

7. A method of assembling and mounting a closet partition system on a building wall, the method comprising:
    providing first and second vertical partitions each including a rear edge, a front edge opposite the rear edge, and a partition body extending between the front and rear edges;
    providing a plurality of brackets, each bracket comprising:
        a seat adapted to receive the rear edge of one of the first and second vertical partitions, the seat defined by a first leg parallel to the rear edge and second and third legs extending orthogonally from a distal end of the first leg; and
        first and second back panel support legs extending orthogonally from the second and third legs respectively;
    mounting one of the plurality of brackets on the rear edge of each of the first and second vertical partitions with each rear edge within the seat of the associated bracket;
    spacing the first and second vertical partitions from one another;
    positioning a first back panel between the first and second vertical partitions;
    securing the first back panel to the second back panel support leg of one of the brackets on the first vertical partition and to the first back panel support leg of another of the brackets on the second vertical partition; and
    mounting the brackets on the wall by securing the first leg of each bracket to the wall, whereby the first back panel is spaced from the wall to define a raceway between the first back panel and the wall.

8. The method of claim 7, further comprising mounting a plurality of the brackets to each of the first and second vertical partitions.

9. The method of claim 8 wherein the mounting step comprises inserting a fastener through an aperture in each bracket and into the associated first or second vertical partitions.

10. The method of claim 7 further comprising:
    mounting a light source to the closet partition system, the light source having an electrical cable; and
    inserting the electrical cable into the raceway through an aperture defined by the first back panel.

11. The method of claim 10 wherein the step of mounting a light source includes mounting the light source on a horizontal shelf supported between the first and second vertical partitions.

* * * * *